ns011270316B2

United States Patent
Donsky et al.

(10) Patent No.: US 11,270,316 B2
(45) Date of Patent: Mar. 8, 2022

(54) SYSTEMS, METHODS, AND APPARATUSES FOR IMPLEMENTING AUTOMATIC ENTRY OF CUSTOMER RELATIONSHIP MANAGEMENT (CRM) DATA INTO A CRM DATABASE SYSTEM

(71) Applicant: IMPLISIT INSIGHTS LTD., Tel Aviv (IL)

(72) Inventors: Elad Donsky, Tel Aviv (IL); Gilad Raichshtain, Haifa (IL)

(73) Assignee: salesforce.com, inc., San Francisco, CA (US)

( * ) Notice: Subject to any disclaimer, the term of this patent is extended or adjusted under 35 U.S.C. 154(b) by 385 days.

(21) Appl. No.: 15/021,695

(22) PCT Filed: Oct. 14, 2014

(86) PCT No.: PCT/IB2014/065299
§ 371 (c)(1),
(2) Date: Mar. 13, 2016

(87) PCT Pub. No.: WO2015/056170
PCT Pub. Date: Apr. 23, 2015

(65) Prior Publication Data
US 2016/0247163 A1 Aug. 25, 2016

Related U.S. Application Data

(60) Provisional application No. 61/891,540, filed on Oct. 16, 2013.

(51) Int. Cl.
*G06Q 30/00* (2012.01)
*G06F 16/28* (2019.01)
(Continued)

(52) U.S. Cl.
CPC ....... *G06Q 30/01* (2013.01); *G06F 16/24578* (2019.01); *G06F 16/285* (2019.01);
(Continued)

(58) Field of Classification Search
CPC ....................................................... G06Q 30/01
See application file for complete search history.

(56) References Cited

U.S. PATENT DOCUMENTS

2004/0181526 A1* 9/2004 Burdick ................ G06F 16/285
2006/0015533 A1 1/2006 Wolf et al.
(Continued)

OTHER PUBLICATIONS

International Application # PCT/IB2014/065299 Search Report dated Feb. 18, 2015.

*Primary Examiner* — Mark D Featherstone
*Assistant Examiner* — Tony Wu
(74) *Attorney, Agent, or Firm* — Elliott, Ostrander & Preston, P.C.

(57) ABSTRACT

A method for data processing includes obtaining from multiple different organizations (24, 52, 54, 56) customer relationship management (CRM) records (110) and communication records (90). Reference vectors (130) of feature values are computed for the communication records in a training set. Global weights are computed for the feature values by evaluating the reference vectors for all of the different organizations. For each organization, respective company weights are computed by evaluating specifically the reference vectors computed over the CRM records and communication records belonging to the organization. For each person belonging to a given organization, respective user weights are computed for the feature values by evaluating specifically the reference vectors computed over the communication records that identify the person as the user. The weights are applied in order to assign the communica-
(Continued)

tion records that are not in the training set to respective ones of the CRM records.

20 Claims, 4 Drawing Sheets

(51) Int. Cl.
G06F 16/2457 (2019.01)
G06Q 10/06 (2012.01)
G06Q 10/10 (2012.01)

(52) U.S. Cl.
CPC ....... G06Q 10/06 (2013.01); G06Q 10/06311 (2013.01); G06Q 10/10 (2013.01); G06Q 10/107 (2013.01)

(56) References Cited

U.S. PATENT DOCUMENTS

| | | | |
|---|---|---|---|
| 2010/0017487 A1* | 1/2010 | Patinkin | G06Q 10/107 709/206 |
| 2012/0072500 A1* | 3/2012 | Greene | G06Q 10/10 709/206 |
| 2012/0143917 A1* | 6/2012 | Prabaker | G06F 17/30165 707/784 |
| 2013/0218883 A1* | 8/2013 | McConnell | G06F 17/30702 707/728 |
| 2013/0218947 A1 | 8/2013 | Zur et al. | |
| 2013/0218991 A1* | 8/2013 | McConnell | G06F 16/337 709/206 |
| 2014/0046711 A1* | 2/2014 | Borodow | G06Q 10/04 705/7.15 |
| 2014/0079297 A1* | 3/2014 | Tadayon | G06K 9/00288 382/118 |
| 2015/0100356 A1* | 4/2015 | Bessler | G06Q 30/01 705/7.12 |

\* cited by examiner

SYSTEMS, METHODS, AND APPARATUSES FOR IMPLEMENTING AUTOMATIC ENTRY OF CUSTOMER RELATIONSHIP MANAGEMENT (CRM) DATA INTO A CRM DATABASE SYSTEM

CROSS-REFERENCE TO RELATED APPLICATION

This application claims the benefit of U.S. Provisional Patent Application 61/891,540, filed Oct. 16, 2013, which is incorporated herein by reference.

FIELD OF THE INVENTION

The present invention relates generally to customer relationship management (CRM) systems, and particularly to methods, apparatus and software for automation of data entry into CRM systems.

BACKGROUND

Computerized CRM systems and software are widely used in all sorts of businesses to manage company interactions with current, future and past customers, including sales, marketing, and customer service and support. CRM systems store contact data, communications, and other customer-related information and documents from all departments that interact with customers in a central repository. This centralization and organization gives management and employees access to data on demand and facilitates cooperation between departments and enhancement of business processes.

The leading supplier of CRM software-as-services at present is Salesforce.com, which offers a suite of cloud-based products, including the "Sales Cloud" sales force automation package. This package keeps track of contacts including leads, opportunities, accounts, partners and competitors. It also integrates with e-mail programs, such as Microsoft Outlook®, and enables users to associate e-mail items with the proper contacts, as well as synchronizing calendars and tracking follow-up of leads and opportunities. Similar capabilities, with similar sorts of sales force automation data models, are offered by other CRM vendors, such as SAP SE (Walldorf, Germany), as well as Microsoft Dynamics CRM and Oracle.

SUMMARY

Embodiments of the present invention that are described hereinbelow provide methods, systems and software for automating the entry of data into CRM systems.

There is therefore provided, in accordance with an embodiment of the present invention, a method for data processing, which includes obtaining from each organization among multiple different organizations a respective first plurality of customer relationship management (CRM) records belonging to the organization, each CRM record including multiple CRM fields containing first data. A respective second plurality of communication records belonging to the organization is also obtained, including a set of the communication records that have been assigned to respective CRM records within the first plurality. Each communication record includes multiple communication record fields containing second data relating to a communication and identifying at least a user of the communication.

Respective reference vectors of feature values are computed for the communication records in the set. Each feature value indicates a degree of correspondence between a second datum in a specified communication record field of a given communication record and a first datum in a specified CRM field of a respective CRM record to which the given communication record has been assigned. Global weights are computed for the feature values by evaluating the reference vectors computed for all of the different organizations. For each organization, respective company weights are computed for the feature values by evaluating specifically the reference vectors computed over the CRM records and communication records belonging to the organization. For each person belonging to a given organization, respective user weights are computed for the feature values by evaluating specifically the reference vectors computed over the communication records that identify the person as the user.

Further vectors of the feature values are computed for the communication records that are not in the set, and the global weights, company weights, and user weights are applied to the further vectors in order to assign the communication records that are not in the set to respective ones of the CRM records. Entries are inserted in the respective ones of the CRM records to indicate the communication records that have been assigned thereto.

Typically, computing the further vectors of the feature values includes computing a respective vector for each communication record and each of one or more candidate CRM records for assignment of the communication record thereto, and assigning the communication record includes applying the respective vector in deciding whether to assign the communication record to each of the candidate CRM records. Applying the respective vector may include computing a weighted sum over the feature values in the respective vector using the global weights, company weights, and user weights, and assigning the communication record to a candidate CRM record if the weighted sum meets a predefined criterion.

In a disclosed embodiment, computing the global weights, company weights, and user weights includes applying a support vector machine to the reference vectors of the feature values for the communication records in the set in order to define classifiers that assign the communication records to the CRM records based on the global weights, company weights, and user weights.

In some embodiments, computing the company weights includes, after computing the global weights, evaluating the reference vectors computed over the CRM records and communication records belonging to each organization in order to find differences between the global weights and the company weights for the organization. Similarly, computing the user weights includes, after computing the company weights for the given organization, evaluating the reference vectors computed over the communication records belonging each person belonging to the given organization in order to find differences between the company weights and the user weights for the person.

Typically, obtaining the CRM records includes identifying in the CRM records at least some of the communication records that have been associated with the respective CRM records, and including the identified communication records in the set for use in computing the weights. Additionally or alternatively, obtaining the CRM records includes, after inserting entries in the respective ones of the CRM records to indicate the communication records that have been assigned thereto, identifying the inserted entries to which modifications were made, after insertion in the CRM records, by users of the CRM records, and computing the global weights, company weights, and user weights includes applying the modifications in determining the weights. The modifications may include deletion of the assigned communication records, reassignment of the assigned communication records to other CRM records, and changes in entries in the CRM records corresponding to the assigned communication records.

In disclosed embodiments, the vectors include feature values indicative of personas occurring both in the given communication record and the respective CRM record, feature values indicative of a relation between a date of the given communication record and timeline of the respective CRM record, and/or feature values indicative of company and product names occurring both in the given communication record and the respective CRM record.

There is also provided, in accordance with an embodiment of the present invention, data processing apparatus, which includes a memory, configured to store records belonging to multiple different organizations. The records include, for each organization, a respective first plurality of customer relationship management (CRM) records belonging to the organization, each CRM record including multiple CRM fields containing first data; and a respective second plurality of communication records belonging to the organization, including a set of the communication records that have been assigned to respective CRM records within the first plurality, each communication record including multiple communication record fields containing second data relating to a communication and identifying at least a user of the communication.

A processor is configured to compute respective reference vectors of feature values for the communication records in the set, each feature value indicating a degree of correspondence between a second datum in a specified communication record field of a given communication record and a first datum in a specified CRM field of a respective CRM record to which the given communication record has been assigned. The processor is configured to compute global weights for the feature values by evaluating the reference vectors computed for all of the different organizations, to compute, for each organization, respective company weights for the feature values by evaluating specifically the reference vectors computed over the CRM records and communication records belonging to the organization, and to compute, for each person belonging to a given organization, respective user weights for the feature values by evaluating specifically the reference vectors computed over the communication records that identify the person as the user. The processor is further configured to compute further vectors of the feature values for the communication records that are not in the set, to apply the global weights, company weights, and user weights to the further vectors in order to assign the communication records that are not in the set to respective ones of the CRM records, and to insert entries in the respective ones of the CRM records to indicate the communication records that have been assigned thereto.

There is additionally provided, in accordance with an embodiment of the present invention, a computer software product, including a non-transitory computer-readable medium in which program instructions are stored, which instructions, when read by a computer, cause the computer to obtain records belonging to multiple different organizations. The records include, for each organization, a respective first plurality of customer relationship management (CRM) records belonging to the organization, each CRM record including multiple CRM fields containing first data; and a respective second plurality of communication records belonging to the organization, including a set of the communication records that have been assigned to respective CRM records within the first plurality, each communication record including multiple communication record fields containing second data relating to a communication and identifying at least a user of the communication.

The instructions cause the computer to compute respective reference vectors of feature values for the communication records in the set, each feature value indicating a degree of correspondence between a second datum in a specified communication record field of a given communication record and a first datum in a specified CRM field of a respective CRM record to which the given communication record has been assigned. The instructions further cause the computer to compute global weights for the feature values by evaluating the reference vectors computed for all of the different organizations, to compute, for each organization, respective company weights for the feature values by evaluating specifically the reference vectors computed over the CRM records and communication records belonging to the organization, and to compute, for each person belonging to a given organization, respective user weights for the feature values by evaluating specifically the reference vectors computed over the communication records that identify the person as the user. The instructions cause the computer to compute further vectors of the feature values for the communication records that are not in the set, to apply the global weights, company weights, and user weights to the further vectors in order to assign the communication records that are not in the set to respective ones of the CRM records, and to insert entries in the respective ones of the CRM records to indicate the communication records that have been assigned thereto.

The present invention will be more fully understood from the following detailed description of the embodiments thereof, taken together with the drawings in which:

DETAILED DESCRIPTION OF EMBODIMENTS

Overview

Although CRM systems that are known in the art provide facilities for storing applicable communications (such as e-mail exchanges and calendar items) in the appropriate CRM records, implementation of this capability requires extensive manual data entry by users of the system. As a result, most CRM systems have problems of partial, missing and "dirty" (inaccurate) data.

Embodiments of the present invention that are described herein address these problems by providing computerized tools that automatically match a company's CRM records and communication records, and on this basis insert appropriate communication-based entries (alternatively referred to simply as "communication entries") into the CRM system without requiring additional user interaction. These tools thus provide the company with more complete and accurate CRM data to assist sales and management personnel in customer follow-up, and may also add insights based on the CRM and communication data, such as identification and development of new opportunities that might otherwise be missed. The present patent application focusing on the matching and entry insertion functions of these tools. These functions operate in conjunction with a company's existing CRM and communication systems without requiring modification to these systems, and are capable of serving multiple, unrelated organizations.

Automatic insertion of communication-related entries into a company's CRM system requires that each relevant communication record be matched to the correct CRM record. Correct matching is a major challenge, since the same salesperson, customer, or product may appear in many different communication records and CRM records. Incorrect matches introduce "noise" into the CRM system that reduces and can even negate the usefulness of the automatic tool.

The embodiments disclosed herein overcome these problems by a process of multi-tier learning, applied at three different levels over multiple different organizations:

Global learning, to extract classification parameters common to all of the organizations that are served by the matching tool, for associating communication records with CRM records.

Company learning, to extract the classification parameters that are unique to each of the organizations and may differ from the global parameters.

User learning, to extract the classification parameters that are unique to particular persons within each organization and may differ from the company parameters.

(The term "company" as used herein refers to an organization, such as a corporate entity, that is distinct in its ownership and operations from other organizations and thus maintains its own, distinct system of CRM records.) This multi-tiered approach is useful in rapid and precise learning and classification, since it provides the benefits of both generalization and differentiation among entities served by the matching tool. In terms of technical effect, it enables the matching tool to extract data from an organization's CRM and communication servers and automatically insert entries into the organization's CRM database with accuracy that was previously unachievable.

In the disclosed embodiments, the matching tool obtains and stores CRM records and communication records belonging to the organization from each organization among multiple different organizations. The CRM records comprise multiple CRM fields containing CRM data, including communication entries. Each communication record likewise comprises multiple communication record fields containing data relating to a communication and identifying at least one user of the communication in question within the organization. Typically, the corpus of communication records collected by the matching tool includes a set of the records that have already been assigned to respective CRM records, and can thus be used as a training set for purposes of the learning process.

To initiate the learning process, the matching tool computes respective reference vectors of feature values for the communication records in the training set. Each feature value indicates a degree of correspondence between a communication datum in a specified field of a given communication record and a CRM datum in a specified field of the CRM record to which the given communication record has been assigned. For example, at the simplest level, a feature value may be one or zero to indicate whether or not one of the names (in the form of e-mail addresses) in the "to" field of an e-mail record is identical to (the e-mail address of) the "owner" of a CRM record; but typically, tens or hundreds of such features are evaluated and included in the feature vector. As other examples, the feature values may indicate a relation between a date of the given communication record and timeline of the respective CRM record, or company and product names occurring both in the given communication record and in the respective CRM record.

Based on these reference vectors, the matching tool computes:

Global weights for the feature values by evaluating the reference vectors computed for all of the different organizations;

Respective company weights by evaluating specifically the reference vectors computed over the CRM records and communication records belonging to each organization; and For each person belonging to a given organization, respective user weights for the feature values by evaluating specifically the reference vectors computed over the communication records that identify the person as the user.

The matching tool then applies these weights in classifying and assigning further communication records that are not in the initial training set. For each of these further records, the tool computes feature values and applies the global weights, company weights, and user weights to the corresponding feature vectors in order to assign the communication records to respective CRM records. The tool then inserts entries in the respective CRM records corresponding to the communication records that have been assigned in this manner.

Typically, the matching tool computes a respective vector for each of these further communication records and each candidate CRM record to which the communication record might be assigned, and uses the feature vector in computing a score. In some embodiments, the matching tool computes the score as a weighted sum over the feature values in the respective vector using the global weights, company weights, and user weights, and then assigns the communication record to a candidate CRM record if the weighted sum meets a predefined criterion, such as if the score exceeds a certain threshold. In the disclosed embodiments, the matching tool applies a support vector machine (SVM) to the reference vectors of the training set in order to define classifiers that assign the communication records to the CRM records and provide values of the global weights, company weights, and user weights.

The global weights, company weights, and user weights may be defined serially. In other words, after computing the global weights, the matching tool evaluates the reference vectors computed over the CRM records and communication records belonging to each organization in order to find differences between the global weights and the company weights for the organization. Then, after computing the company weights for a given organization, the matching tool evaluates the reference vectors computed over the communication records belonging to each person in the given organization in order to find differences between the company weights and the user weights for the person. The company weights and user weights may then be stored and applied in the matching process as difference values, relative to the global or respective company weight.

The matching tool may assemble the initial training set automatically, by identifying in the CRM database certain communication records that have already been associated with particular CRM records (for example, communication entries that have been saved in the CRM system manually by system users). After the matching tool has processed communication records to assign them to CRM records and has accordingly inserted entries in the CRM records, the matching tool may subsequently identify the inserted entries to which modifications were made by users of the CRM records. Such modifications may comprise, for example, deletion of the assigned communication records, reassignment of the assigned communication records to other CRM records, and/or changes in entries in the CRM records corresponding to the assigned communication records. These sorts of modifications can be particularly useful in correcting the weights, and the matching tool applies them accordingly.

System Description

Figure 1:
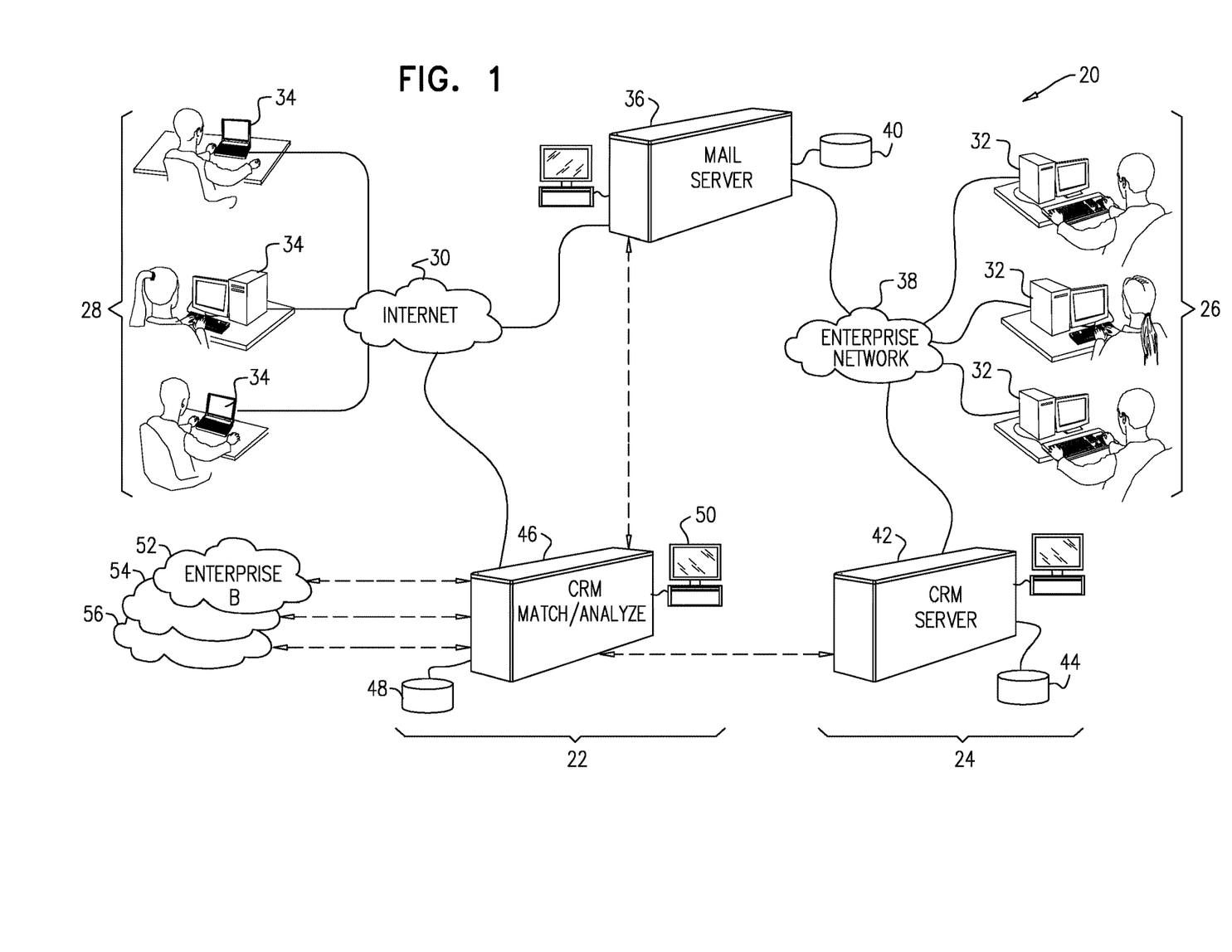
FIG. 1 is block diagram that schematically illustrates a system for communications and customer relationship management, in accordance with an embodiment of the present invention.

FIG. 1 is block diagram that schematically illustrates a system 20 for communications and customer relationship management, which uses a CRM matching and analysis tool 22 in accordance with an embodiment of the present invention. System 20 serves an organization 24, which includes many users 26, in its interaction with customers 28. Much of this interaction has to do with communication via public networks 30, such as the Internet, and the elements of system 20 are typically (although not necessarily) connected physically to one another via the Internet. Tool 22 interacts with and serves not only organization 24, but also other organizations 52, 54, 56, . . . , represented as enterprises B, C, D, . . . . Organizations 24, 52, 54, 56, . . . , are independent of one another, in the sense that they typically have different sets of users 26 and customers 28; deal with different lines of products and services; and are unaffiliated with one another in terms of ownership of the organizations.

Users 26 in organization 24 may generate various types of communication records, relating to e-mail, calendar entries, voice calls, and video conferences, for example, and tool 22 may receive and process records of all such types of communications. For the sake of simplicity, however, the present example will focus on e-mails exchanged between user computers 32 and customer computers 34 via network 30. Such e-mails are transmitted and received via a mail server 36, which may be either a dedicated physical server maintained in organization 24 or a remote server (in a cloud-based service, for example) that is maintained by a service provider. In the pictured example, user computers 32 communicate with mail server 36 and other components of system 20 via an enterprise network 38. Alternatively or additionally, user computers 32 may include mobile devices, such as smart phones and tablets, as well as home computers, which are used outside the confines of organization 24 and communicate with mail server 36 and other system components via public network 30 and/or other private networks. In any case, mail server 36 maintains its communication records in a memory 40, such as disk storage, typically in the form of a database.

A CRM server 42 maintains CRM records for organization 24 in a memory 44, typically in the form of a CRM database. As in the case of the mail server, CRM server 42 may comprise a dedicated server within organization 24, as shown in FIG. 1, or may be maintained remotely, possibly as a cloud-based service.

Matching and analysis tool 22 comprises a processor 46, which communicates with mail server 36 and CRM server 42, as well as with other organizations 52, 54, 56, . . . , typically (although not necessarily) via network 30. Processor 46 is coupled to a memory 48, which stores both program code, for carrying out the functions described herein, and data collected from servers 36 and 42. The functions of tool 22 are described in detail hereinbelow.

Processor 46 typically comprises one or more general-purpose computer processors, which are programmed in software to carry out the functions that are described herein. The software program code may be stored in memory 48, typically in tangible, non-transitory storage media, such as optical, magnetic, or electronic memory media. Tool 22 may also comprise a user interface 50, as well as other appropriate communication and computing components that are known in the art. Although tool 22 is shown in FIG. 1 as a single physical unit, the functions of tool 22 may alternatively be distributed over multiple computers and may be implemented in a cloud-based service. Further additionally or alternatively, some or all of the functions of tool may be integrated with CRM server 42 or mail server 36.

Figure 2:
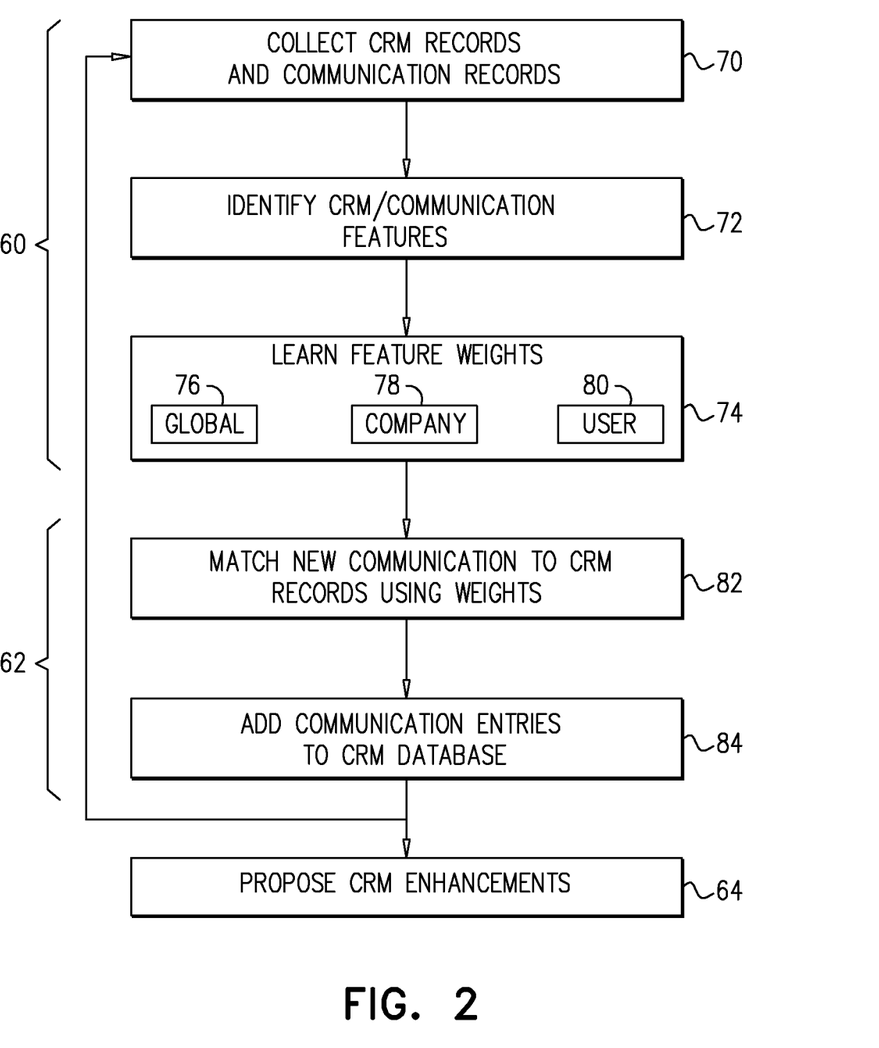
FIG. 2 is a flow chart that schematically illustrates a method for automated CRM data entry, in accordance with an embodiment of the present invention.

FIG. 2 is a flow chart that schematically illustrates a method for automated CRM data entry performed by tool 22, in accordance with an embodiment of the present invention. The method includes two stages: a learning stage 60 and a matching stage 62. In learning stage 60, tool 22 collects and analyzes data from mail server 36 and CRM server 42 in order to identify features and compute the appropriate weights to assign to each. These weights are then applied in matching stage 62 in order to assign communication records to CRM records. This assignment may take the form of a Customer Communication Graph (CCG), which represents the full matching result of the stage 62 across all entities. The CCG is a bipartite graph containing two sets—U: all communication entities, and V: all CRM Records. An edge e exists between vertices u and v if and only if u and v are found to match in stage 62.

Stages 60 and 62 may be performed in alternation, whereby the results of learning stage 60 are updated from time to time (for example, once a week or once a month) using new inputs that have been collected in the interim, and the updated weights are then applied in refining the matching results in stage 62.

The results of automatic assignment of communication records to CRM records in stage 62 may be used in proposing enhancements to the CRM system maintained by organization 24, at a CRM enhancement stage 64. These enhancements may include, for example:

Identify and suggest new opportunities not yet listed by CRM server 42.

Identify and report changes in the stage, dates or amounts of opportunities listed by CRM server 42.

Identify and issue alerts with regard to opportunities that require sales or management attention.

Identify new leads not yet listed by CRM server 42 and issue alerts with regard to possible lead conversion.

Measure and report performance of sales representatives and levels of customer engagement and satisfaction, Further details of the operation of stage 64 are presented in the above-mentioned provisional patent application.

Learning stage 60 begins with collection of CRM records from memory 44 and communication records from memory 40, at a data collection step 70. Typically, these records are held in memory 48 during processing. Processor 46 identifies some of these records as training data, including specifically those communication records regarding which entries have already been made in corresponding CRM records. For example, processor 46 may find e-mail entries that users 26 have assigned to particular opportunities and consequently entered them manually in appropriate CRM records, in order to keep track of e-mail communications that they have conducted with customers 28 or other parties regarding opportunities listed by CRM server 42. In such cases, tool 22 may be confident that the e-mails in question are correctly assigned to the corresponding CRM records. As another example, processor 46 may identify e-mail entries that were made automatically by tool and were later modified by users 26, and may incorporate these entries in the training set, as well.

Processor 46 identifies and computes values of features of the communication records and CRM records in the training set, at a feature identification step 72. A "feature" in this context refers to an attribute shared by a communication record (such as an e-mail) and a particular CRM record. The value of the feature indicates, for each candidate CRM record to which a particular communication record may be assigned, the degree to which the attributes in question match. For example, each e-mail/CRM record pair may have features indicating whether the "to" field, "from" field, or "cc" field of the e-mail contains the name of the user who is the "owner" of the CRM record in question. (The term "names," as used in the context of the present description and in the claims, should be understood as including e-mail addresses within its scope.) The values of these features are binary—one or zero to indicate whether or not the fields match. Other features, such as match scores computed over the textual content of the e-mail message, may have continuous values, but processor 46 may normalize and binarize them, as well.

Processor 46 typically computes an entire vector of different feature values for each communication/CRM record pair that is identified in the training set. Details of further features that may be incorporated in the feature vector and methods for their computation are described hereinbelow with reference to FIG. 3.

Using the feature vectors computed at step 72, processor 46 applies an automatic learning process to assign weights to all the features in the vector, at a weight learning step 74. The weight of each feature indicates the relative correlation between the value of the feature and the likelihood of a match between the communication record and the candidate CRM record for which the feature is computed. In other words, assuming that the feature vector is a vector of binary values, a strong positive weight for a given feature means that a match is likely when the feature has the value one, while a negative weight indicates that a match is unlikely in such a case. (For example, the inventors have found that although features indicating that the "to" or "from" field of an e-mail matches the "owner" of a CRM record typically have strong positive weights, the feature indicating a match between the "cc" field of the e-mail and the "owner" should generally receive a negative weight.)

As explained above, learning step 74 actually comprises three sub-steps: a global learning step 76, a company learning step 78, and a user learning step 80. These steps are typically (although not necessarily) carried out serially, so that the results of step 76 serve as the basis for step 78, and the results of step 78 serve as the basis for step 80. Details of step 74 and its sub-steps are presented in FIG. 4. Upon completion of step 74, processor 46 has computed three sets of weights: global weights over all organizations sampled by tool 22; company weights $\{c_i\}$ for each organization; and user weights $\{u_i\}$ for each user in each of the organizations. Assuming the feature vector contains an array of n feature values, there will similarly be n weights in each set, i.e., i=1, . . . , n. The weights are typically normalized to a predefined range, such as [−1, 1].

In matching stage 62, processor 46 computes the feature vectors for communication records that have not yet been classified and stored in the CRM database in memory 44, at a vector evaluation step 82. The feature values are computed using the same criteria as were applied in step 72. For each communication record, processor 46 computes feature vectors with respect to a number of candidate CRM records that are identified as likely matches, or possibly with respect to all CRM records of the organization to which the communication record belongs.

In order to choose the candidate CRM records for a given e-mail, processor 46 may, for example, extract all domains (company.com) from the addresses of the email recipients and text (including recipients of all other e-mails in the same thread). The processor may also extract named entities from the e-mail text. Processor 46 then chooses as candidates those CRM records that have a relation to at least one of the domains or entities extracted. (For example, if the email was sent to someone@intel.com, all opportunities related to all Intel accounts may be selected for matching). The matching process is not applied to e-mails that are not relevant to customer relationships, such as e-mails sent by robots (automatic e-mails), spam, and internal emails.

For each feature vector $\{f_1, \ldots, f_n\}$ of each communication record/CRM record pair, processor 46 computes a score s, using the weights found at step 74:

$$s = \sum_{i=1}^{n}(g_i + c_i + u_i)f_i \quad (1)$$

Processor 46 finds the pair of records to match if the corresponding score s exceeds a predefined threshold. The threshold may be set empirically, in order to maximize the accuracy of assignment, i.e., to achieve the desired balance between false-positive assignments and false-negative, missed matches.

For each match identified at step 82, tool 22 adds a new communication entry in the corresponding CRM record held by server 42, at an entry creation step 84. Typically, processor 46 transmits a message over network 30 to CRM server 42, instructing server 42 to create the entry in the appropriate record in memory 44, as though one of users 26 had submitted such an instruction. The updated entry will then be available to users 26 for subsequent reference, as well as to tool 22 for use at step 64. In addition, if a user finds that some aspect of an entry of this sort in a CRM record is incorrect, the user may correct the entry, for example, by deleting it, editing it (making changes in the record), or moving the entry to a different record. CRM server 42 keeps track of such changes and reports them to tool 22 at the next iteration through step 70.

Feature Computation and Learning

Figure 3:
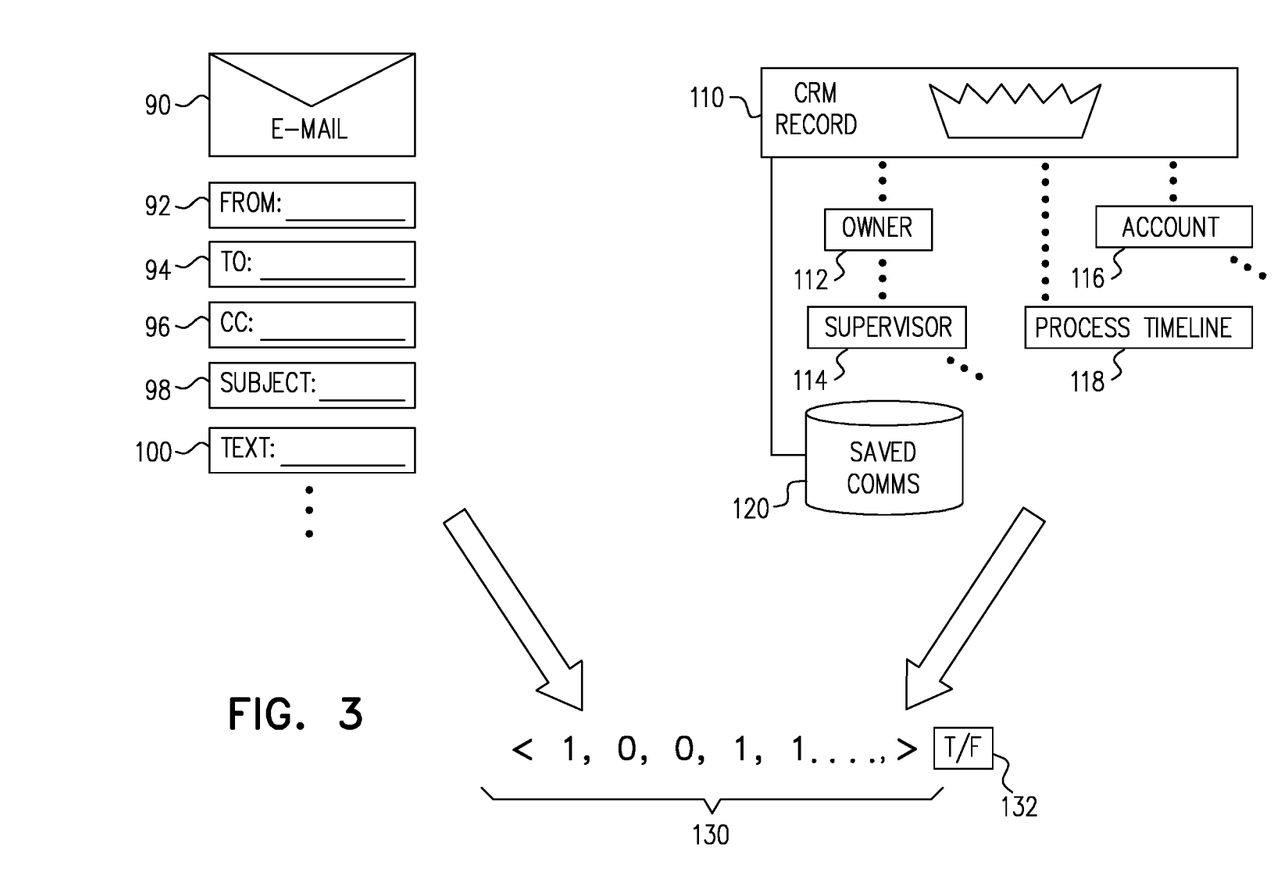
FIG. 3 is a block diagram that schematically illustrates a method for construction of feature vectors, in accordance with an embodiment of the present invention.

FIG. 3 is a block diagram that schematically illustrates a method for construction of a feature vector 130 between a communication record, such as an e-mail 90, and a candidate CRM record 110, in accordance with an embodiment of the present invention. The types and features of the CRM records that are relevant in this regard are listed below in Appendix A.

As a preliminary step, as noted above, in order to choose the e-mails to be matched to CRM records, processor 46 of tool 22 identifies the e-mails that are related directly to customer accounts, opportunities and leads, and discards other e-mails (such as automatic, spam, and internal e-mails) from further processing. In addition, to enhance the accuracy of matching between the chosen e-mails and CRM records, processor 46 cleanses the CRM and e-mail data that are to be used in the matching process. These aspects of the present embodiment are described below in Appendix B.

Processor 46 then extracts the following data from each e-mail 90 that is chosen for processing:
  Personas:
    Participants—the sender 92, direct recipients 94 and all indirect recipients 96 of the e-mail (cc, bcc).
    E-mail addresses of personas that are mentioned in the e-mail body text 100.
  Date/Time:
    Sending date/time of the message.
    In case of a calendar message—the time of the calendar entry.
  Named Entities (people, companies and products):
    Extracting Named Entities from subject 98.
    Extracting Named Entities from body text 100.
  Other:
    E-mail conversation (thread) ID—relating to all other e-mails in the same conversation.
    Conversation type (as explained in Appendix B).
    Classification to special type (as defined in Appendix B).

Processor 46 extracts the following data from each CRM record 110:
  Personas:
    The owner 112 of the entry (CRM user name).
    List of former owners of the entry.
    List of users who have modified the entry (change history).
    Related contacts of the entry (including Partner/Channel contacts related to this opportunity or its Account 116).
  Teams:
    The hierarchical teams and groups to which the different personas belong, such as a supervisor 114 of owner 112.
  Process timeline 118:
    Creation date.
    Last modification date.
    Close date (if exists).
    Lead conversion date (in relation to a CRM Contact).
  Named Entities:
    Extracting Named Entities from record name and description.
  Other:
    Related records (e.g., an Opportunity record is likely to have a single Account-related record).
    E-mails and other communication activities that were manually attached to the entry 120.
    Documents that were attached or related to the entry.
    Other raw data that are already attached to the entry.

The above communication and CRM data are listed by way of example, and additional features may similarly be extracted and applied in the matching process, as will be apparent to those skilled in the art after reading the present disclosure.

In order to choose the candidate CRM records 110 to which a given e-mail 90 may be matched, processor 46 sorts the CRM records in relation to the characteristics of the e-mail, for example:
  Contact—If a CRM contact is one of the e-mail message participants (such as the sender 92 or one of recipients 94, 96), the e-mail is matched to the relevant contact.
  Account—If the e-mail conversation type is "Account," and it is not part of any of the "special type classifications" defined in Appendix B, the e-mail is matched to the relevant account.
  Lead—If the conversation type is "Lead," and it is not part of any special classification, the e-mail is matched to the relevant lead.
  Opportunity/Case—The matching to an opportunity or other case is more complex, and uses feature vector 130 and a resultant feature match score function. In this context, the term "Process" refers to either an "Opportunity" or a "Case," and matching of an e-mail to a. Process is determined according to the following criteria:
    First step—In order to be matched to a Process, the e-mail first has to be matched to an Account (as explained above). Only Processes that are related to that Account (belonging to that account, or connected to the account through a contact role or other similar property) are relevant for scoring their match against the e-mail message.
    Second step—All Process features are matched against all e-mail message features and the matching score is calculated. The matching score is the sum of a weighted series of feature similarity scores, as explained above.

Feature vector 130 may contain elements corresponding to the following features, for example, wherein each vector element receives the value one or zero depending on whether the feature evaluates as true or false:
  Personas:
    Whether a Process-related contact is one of the e-mail message participants.
    Whether the Process owner, former owner or modifier is one of the e-mail message participants.
    Whether any of the team or group members of the Process owner, former owner or modifier are among the e-mail message participants.
  Date/Time:
    Whether the e-mail message sending time is close to the time range between the Process creation and close dates.
    Whether the number of different Processes that were already opened at the time that the email message was sent exceeds a certain threshold. The Process owners and their team or group may also be taken into account for this score.
  Named Entities:
    Whether a Named Entity found in the Process data matches an e-mail Named Entity,
  Other:
    Whether other Process-related CRM records (related Account, contact role, tasks) correspond to other e-mail messages in the same e-mail thread.

For e-mails 90 in the training set that is used in step 74 (FIG. 2), a match n flag 132 is maintained to indicate whether the e-mail is correctly matched to CRM record 110. Most commonly, flag 132 is set depending on user input, i.e., an indication by one of users 26 that this particular e-mail should or should not be assigned to this CRM record 110.

For this purpose, tool 22 automatically matches e-mails that were manually entered into the CRM database in memory 44, or sent from CRM server 42, to e-mails found in a user mailbox on mail server 36. This matching may be based on the following logic:

1. The subjects and text bodies of e-mails coming both from CRM server 42 and user mailboxes are normalized, in order to ignore spaces, some letter-case variants in "RE" and "FW" prefixes, and some additional differences.
2. Automatic signatures are stripped from the e-mail text signatures added by antivirus programs, "confidentiality" signatures, and other signatures, typically based on the company's proprietary database of signatures).
3. Tool 22 identifies a match between an e-mail entry in a CRM record and a mailbox e-mail when all of the following features occur:
   a. The normalized subjects of the CRM e-mail entry and the mailbox e-mail match.
   b. The normalized bodies of the CRM e-mail entry and the mailbox e-mail match.
   c. The dates of the CRM e-mail entry and the mailbox e-mail match to within a predefined interval.

Tool 22 may also match calendar items (such as meetings, calls, n similar fashion, by treating the calendar item as an e-mail. Each field in the calendar item record is treated as an e-mail message field, mutatis mutandis (for example, the meeting subject replaces the e-mail subject, and the meeting participants replace the e-mail recipients). The matching algorithm for e-mails is then applied to the transformed calendar item.

Figure 4:
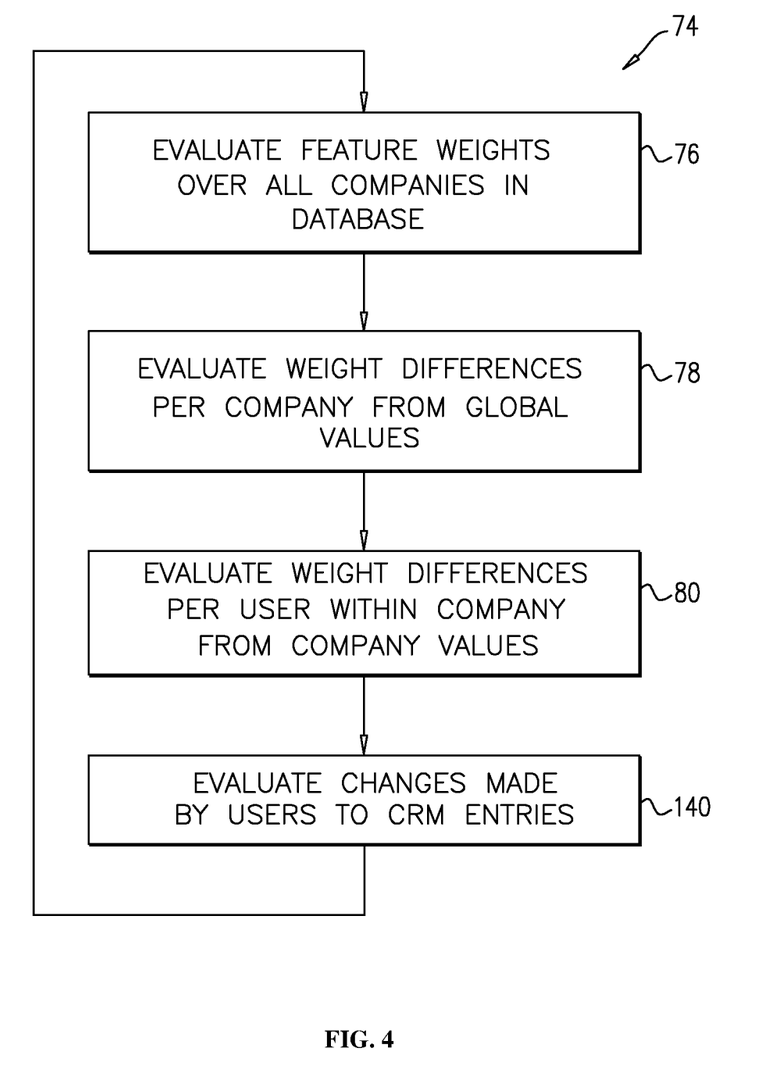
FIG. 4 is a flow chart that schematically illustrates a method for automatic learning of feature weights, in accordance with an embodiment of the present invention.

FIG. 4 is a flow chart that schematically shows details of learning step 74, in accordance with an embodiment of the present invention. Processor 46 first computes the global model weights over all organizations served by tool 22, at global learning step 76. In this step, the processor computes respective feature vectors 130 for all e-mail/CRM record pairs in the training set and then finds the respective weights $g_i$ of the features that, when inserted into formula (1) above, will provide the widest possible separation between correct assignments and incorrect assignments. In other words, when such weights are applied to feature vectors computed for e-mail/CRM pairs outside the training set, correct assignments of e-mails to CRM records (i.e., assignments corresponding to those that would be made by a human user) will receive high positive scores, while incorrect assignments will receive much lower scores.

Various methods that are known in the art may be used in step 76 (and in subsequent steps 78 and 80) in computing optimal weights using the given training set. The inventors have found that a support vector machine (SVM) gives good results in generating classifiers (in terms of feature weights) that maximize the distance, in feature space, between different CRM records to which e-mails are to be assigned. For example, the Python™ scikit-learn SVM package (specifically the linear kernel SVM) can be adapted for this purpose with good results.

Having the global set of weights found at step 76 is useful in efficient learning and in making initial assignments of e-mails to CRM records for organizations newly served by tool 22. Because of the statistical nature of the classification, and in particular due to variations in communication and business practices among different organizations served by tool 22, however, a significant number of incorrect classifications can be expected if only the global weights $g_i$ are used. For this reason, processor 46 evaluates the company model weights for each organization at step 78. The company model weights are computed in terms of the difference of each weight $c_i$ relative to the corresponding global weight $g_i$. The company weights are computed in like fashion, using an SVM, for example, except that the training set in this case includes only the e-mail/CRM record pairs belonging to the organization in question.

Finally, given both the global and company weights, processor 46 computes user model weights $u_i$ for each user at step 80. These weights account for the differences in e-mail and business practices among different users within each organization and are intended to achieve the maximal possible separation among e-mail classifications. Again, the user model weights are computed in terms of the difference of each weight $u_i$ relative to the corresponding company weight $c_i$, using only the e-mails belonging to each particular user in computing his or her set of weights. Processor 46 thus applies the SVM for each user individually at this step.

Tool 22 updates its set of training data from time to time, at a benchmarking step 140, based on user entries made at step 84 Processor 46 then repeats steps 76, 78 and 80 in order to refine the weight values and improve the classification results. For example, processor 46 may recompute the global model once a month, the company model once a week, and the user model once a day, depending on the availability of new training data. Recomputation steps may be skipped if no new training data are available.

At benchmarking step 140, tool 22 updates its sets of training data based on user inputs to CRM server 42, and may typically add the following sorts of information:

As explained above, all communication records related to a given user that have been manually matched to CRM records (not by tool 22) are taken into consideration. These records are taken directly from the data that already exists in memory 44 of CRM server 42. Flag 132 is set to "true" for these e-mail/CRM record pairs and the corresponding feature vectors 130.

All communication entries in the CRM database that were inserted by tool 22 and were manually deleted by the user later on (after insertion), are considered to be algorithm mismatches (False Positives). Flag 132 for these e-mail/CRM pairs and their feature vectors 130 is set to "false."

All records that were inserted by tool 22 and for which some of the inserted details were changed by the user later on (after insertion) are taken into consideration. Feature vector 130 may be recalculated, and flag 132 is set to "true."

All records that were matched and inserted by tool 22 and were manually moved by a user later on (after insertion) are considered to create one False Positive (for the wrong original match) and one True Negative (for the manual match after the user changes). Feature vectors 130 are computed for both e-mail/CRM pairs, with flag 132 set to "false" for the original match and "true" for the corrected match.

The appropriate components of learning step 74 are then repeated, and the resulting refined weights are applied in matching new communication records collected at step 84 from mail server 36.

Although the embodiments described herein relate specifically to CRM systems and records, the principles of the present invention may similarly be applied, mutatis mutandis, in enterprise record-keeping systems of other sorts. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A—CRM ENTRIES

Contact—a record that represents an individual, which a business communication between him and the Company was established.
Account—a company that had/has relations with the Company. An account may have several contacts related to it.
Lead—details of a person that might be interested in the Company's services.
Opportunity—a sales process related to an Account. An Account might have several opportunities.
Contract—a contract that is related to a sales opportunity.
Case—a customer support ticket. Related to an existing Account, which already uses the company services.
User—a user of the CRM system. Might be an employee or any third party person approved by the Company.
Opportunity Stage—an opportunity is a multi-stage process. Each stage is defined by the Company and recorded as an Opportunity Stage in the CRM system.
Close Date—the date by which an opportunity is expected to be closed (either as 'Won' or 'Lost').
Partner/Channel—a sales partner/channel, a marketing/support/lead generation partner, a legal firm, or any other kind of external function who collaborates with the Company on Accounts, Opportunities, Cases, Contracts, Contacts and Leads.
Lead Conversion—the process of converting a lead record into a new Account, Contact, and Opportunity records.

APPENDIX B—DATA CLASSIFICATION AND CLEANSING

Given an e-mail message, tool 22 first identifies its conversation type. The conversation type can be one of the following:
Internal—a conversation between internal entities within the Company (and them only), including employees and all third parties working for the Company (agents, consultants, etc.)
Account—a conversation between one or more Contact entities related to a CRM Account and the Company.
Lead—a conversation between a CRM Lead and the Company.
Unknown Domain—a conversation involving e-mail addresses whose domain name was not related to any CRM Account.
Non-Business—a non-business related e-mail (spam, personal e-mails, etc.)
Other—none of the above.
The participants of an e-mail message are defined to be the sender and all the recipients of the message.
Internal Conversation
A conversation in which all participants are related to the Company. There are several ways of verifying whether an e-mail address (of a participant) is internal:
Registered as a user in the CRM.
Related to one of the Company's domain names.
Is explicitly registered as an internal e-mail address in memory 48 of tool 22.

Account Conversation
A conversation between the Company and one of its Accounts (found in the CRM database). A participant's e-mail address is identified as related to an Account if:
It is explicitly identified as a contact related to an Account in the CRM.
The e-mail address domain matches a domain that is related to a CRM Account. (For more information see the section below regarding matching internet domain names.)
Lead Conversation
A conversation between the Company and one of its Leads (explicitly found in the CRM database). At the time of the e-mail message, the lead status should be "non-converted."
Unknown Domain Conversation
A conversation between the Company and participants having e-mail addresses from a single domain only. This domain should not match any known Account domains.
Non-Business Conversation
Tool 22 automatically identifies e-mails that are not business-process related. There are two kinds of traits that define such e-mails:
1) Non-Business (Irrelevant) E-Mail Address
Any e-mail conversation that involves an address that is marked as irrelevant (see below) will be marked as an irrelevant message.
An address is marked as irrelevant address according to the following criteria:
Not found in the CRM records.
Starts with a prefix that is defined as irrelevant (robot, newsletter, no-reply, etc. . . . ). The full list is generated from a variety of open databases as well as company proprietary data sources.
Part of a non-business related e-mails group or distribution list.
Identified as a private e-mail address—belonging to a public e-mail provider domain, through a list of such domains that is generated from a variety of open databases as well as company proprietary data sources.
Identified as a sender of more than ten different irrelevant e-mails.
2) Non-Business (Irrelevant) E-Mail Message
An e-mail message is marked as irrelevant according to the following criteria:
Has a single "To" recipient address, and this address belongs to one of the Company e-mail domains. Also, has no other recipients.
The e-mail conversation thread contains only one e-mail.
It is not a calendar-related item.
The e-mail body text is searched for a list of weighted textual expressions. The business relevance of the e-mail is then decided upon according to the results of the search results. The list of the textual expressions may be manually generated from open sources as well as from company proprietary data.
Any draft e-mail is considered irrelevant.
Any e-mail that is marked as spam when analyzed by various existing spam-filtering algorithms.

Classification of E-Mails to Special Types

An e-mail can be of one or more special types. The classification to these special types helps tool 22 to understand the relevancy of an e-mail to a business interaction.
"Out of Office" Autoreply
An e-mail message is marked as an automatic "Out of office" message according to the following features:

Is not a forwarded (FW) or a reply (RE) e-mail.
Is addressed to a single recipient.
The subject matches an automatic reply pattern or an Out-of-office pattern. The patterns match various forms of automatic reply and Out-of-office messages, in different languages.
A heuristic text search on the e-mail content, which matches (with a high probability) Out-of-office e-mail content. The heuristic search may be based on company proprietary data, as well as on the Out-of-office message configurations found in the users' mailbox configurations.

Scheduling

An e-mail message is marked as scheduling message, according to the following features:
Marked as a "calendar item" by the e-mail server.
The e-mail subject matches a calendar item subject pattern. The patterns match various forms of calendar and scheduling related messages, in different languages.
Contains scheduling-related text (e.g., "How about next Monday?", "Can we do August $4^{th}$, 3 pm?"), based on contextual text analysis.
Calendar messages include (but are not limited to) recipient replies (accept/tentative/decline), meeting cancellations, new time proposals for the meeting, forwards of a meeting to additional attendees, meeting messages generated from various collaboration platforms (such as GoToMeeting, Webex, etc.), and other types.

Delivery Status Notification

An e-mail that matches one of the delivery notification patterns is considered to be a "delivery status notification." The list of patterns may be generated from open sources as well as from company proprietary data.

Draft E-Mails

An e-mail is considered as "draft" if it appears only in a single user mailbox and is marked as a draft e-mail by the e-mail server.

Matching Internet Domain Names

As part of the matching process, the system determines whether a given list of domains is related to a given textual value (e.g., company name).

Unifying Domain Names

As a part of the matching process, a unified domain name is used. The system unifies the domain name by following these steps:
1. Lower-casing the domain name string.
2. Removing some special characters.
3. Removing common suffix, i.e., the suffix of the domain name that is a general domain suffix, according to open sources.

Matching Steps

The steps for finding a match between an input string and a domain name:
1. The lower-cased domain name is searched within the lower-cased string.
2. Any of the lower-cased words within the string match a unified domain. A match of the words with the unified domain is declared when:
 a. There is a word of more than two letters long, and it is equal to the unified domain.
 b. For each word found within the domain, the total match score is increased.
 c. For each word found at the beginning of the domain name, the total match score is further increased.
3. Tool 22 may use several string similarity algorithms (QuickSilver, Levenshtein, etc.) in calculating the domain name match score.
4. Tool 22 prepares a new set of words from the string, where in addition to splitting the string into words, the words are also split to sub-words based on capital letters e.g., a word "FooBar" is split into the words "Foo" and "Bar"). Then every word in the resulting list is split into sub-words by checking its parts against an English words dictionary (for example, the word "shockwave" will be split into the words "shock" and "wave").
5. Tool 22 checks for abbreviations. An abbreviation is defined as a combination of the first letters of all word in the word set. Abbreviations are created for all words over three characters long, two characters long, one character long, and any word. For example, for the words "This", "is", "an", "example"—the string "te" is an abbreviation when taking only words over two letters long, and the string "tiae" is an abbreviation if taking all words over one letter long.

Tool 22 checks all combinations of abbreviations of these words against the domain name, and whether any abbreviation of at least two characters long is found as a substring of the domain name or whether the domain name is found as a substring of the abbreviation. Tool 22 identifies a match if such combination was found, and the ratio between the lengths of the domain name and the abbreviation is above a certain threshold.
6. If there is no match according to abbreviations, tool 22 compares all combinations of abbreviation by prefixes with the domain name, and checks whether any abbreviation is found as a substring of the domain name. A match is identified if such combination is found, and the ratio between the lengths of the domain name and the abbreviation is above a certain threshold. An abbreviation by prefixes is defined as a combination of prefixes of the words, for all possible prefix lengths longer than a certain minimal length and shorter than a certain maximal length, and with certain total minimal and maximal length for the aggregated abbreviation. For example, for the words "This", "is", "an", "example": "thex" and "thisexam" are two of the possible prefix abbreviations, when taking only words over two letters long.
7. Steps 1-6 above are repeated, while replacing every "&" character in the string with an "n: character.
8. The domain website is crawled, and all strings in the landing HTML page are collected. A match is decided upon if the similarity ratio between some of the strings and the input string is above a certain threshold.
9. If the domain name already matches another string, a match is decided upon if the similarity ratio between some of the strings and the given string is above a certain threshold.

The invention claimed is:
1. A method performed by a system having at least a processor and a memory therein to execute instructions, wherein the method comprises:
 storing a plurality of Customer Relationship Management (CRM) within a CRM system, each CRM record including one or more communication records;
 retrieving a plurality of record-pairs from the CRM system, each defining a communication-record to CRM-record as the respective record-pair;
 wherein each of the plurality of record-pairs defines one of: (i) a false-record-pair having a communication-record incorrectly assigned to a CRM-record and later manually deleted or reassigned within the CRM system or (ii) a true-record-pair having a communication-record correctly assigned to a CRM-record via manual matching to a CRM record within the CRM system;

calculating feature-values for each of a plurality of features identified among the plurality of record-pairs, each feature-value indicating a degree to which an attribute shared by a respective communication record and the associated CRM record within any of the record-pairs match; calculating via a support vector machine global weights for the feature-values across a plurality of organizations that provide greatest separation between the correct-assignments of the true-record-pairs and the incorrect-assignments of the false-record-pairs;

evaluating the feature-values to serially calculate:
- a company-specific weight providing greatest separation between the correct-assignments and the incorrect-assignments for only the record-pairs belonging to each of the plurality of organizations, wherein the company-specific weight is calculated based on a difference value between the global weights and the company-specific weight, and
- a user-specific weight providing greatest separation between the correct-assignments and the incorrect-assignments for a plurality of users, wherein the user-specific weight is calculated based on a difference value between the company-specific weight and the user-specific weight;

scoring a new communication record not in the plurality of record-pairs against a plurality of candidate CRM records, each scored as a weighted sum over the feature-values using the global weights, the company-specific weights, the user-specific weights, and the difference values calculated; and matching and assigning the new communication record to one of the candidate CRM records based on the scoring exceeding a pre-defined threshold, wherein the pre-defined threshold is configurable to maintain a target number of false-record-pairs and true-record-pairs; and automatically inserting entries into the candidate CRM records corresponding to the assigned communication records.

2. The method of claim 1:
wherein the user-specific weights account for differences in e-mail and business practices among different users within each of the plurality of organizations and are calculated to provide maximal separation among e-mail classifications represented within the feature-values indicating the degree to which each attribute shared by the respective communication record and the associated CRM record within any of the record-pairs match;
the method further comprising:
computing a feature vector of the feature values selected from the plurality of features in the training set for each record pair of the plurality of record-pairs; and
wherein the feature vector defines a vector of binary values indicating a higher degree of correspondence for the features of the record pairs having a binary value of "1" defined by the feature vector and indicating a lower degree of correspondence for the features of the record pairs having a binary value of "0" defined by the feature vector.

3. The method of claim 1, wherein calculating feature-values for each of the plurality of features identified among the plurality of record-pairs, comprises:
calculating the feature values, wherein each feature value indicates a degree of correspondence between a communication datum in a specified field of a given communication record from among the plurality of record pairs and a CRM datum in a specified field of a corresponding CRM record of the respective record pair to which the given communication record was correctly or incorrectly assigned.

4. The method of claim 1, further comprising:
computing a feature vector of feature values selected from the plurality of features for each record pair; wherein the feature vector indicates a match is likely for the features of the record pairs having a binary value of "1" defined by the feature vector and further indicates a match is unlikely for the features of the record pairs having a binary value of "0" defined by the feature vector.

5. The method of claim 1, wherein the plurality of features further define:
first contents derived from a first field of the communication record within one of the plurality of records pairs;
second contents derived from a second field of the CRM record within the one of the plurality of records pairs; and
wherein the feature is identified based on the first contents containing the second contents or based on the second contents containing the first contents.

6. The method of claim 1, further comprising assembling a machine learning training set by identifying each of:
(i) manually saved communication records in the CRM database system, each having been manually saved to an associated CRM record by a system user of the CRM database system indicating a correct assignment;
(ii) manually deleted communication records in the CRM database system, each having been manually deleted from a previously associated CRM record by a system user of the CRM database system indicating an incorrect assignment; and
(iii) manually reassigned communication records in the CRM database system, each having been manually reassigned from a previously associated CRM record to a different CRM record by a system user of the CRM database system indicating both a previously incorrect assignment prior to reassignment and a correct assignment subsequent to reassignment.

7. The method 41:
wherein manually saved communication records in the CRM database system generate one of the true record pairs based on each manually saved communication record having been manually saved to an associated CRM record by a system user of the CRM database system indicating a correct assignment;
wherein manually deleted communication records in the CRM database system generate one of the false record pairs based on each manually deleted communication record having been manually deleted from a previously associated CRM record by a system user of the CRM database system indicating an incorrect assignment; and
wherein manually reassigned communication records in the CRM database system generate one of the false record pairs and one of the true record pairs based on each manually reassigned communication record having been manually reassigned from a previously associated CRM record to a different CRM record by a system user of the CRM database system indicating both a previously incorrect assignment prior to reassignment as the false record pair and further indicating a correct assignment subsequent to reassignment as the true record pair.

8. The method of claim 1, wherein the plurality of record-pairs include one or more modified communication records within the CRM system, each modified communication record having been modified by a system user to delete or change an assignment of the respective communication record from one of the plurality of CRM records within the CRM system.

9. The method of claim 1, wherein the communication records comprise one or more of:
e-mail communication entries;
calendar entry records;
voice call records;
video conference records;
email recipients of an email communication;
email text of an email communication;
email subject of an email communication;
email body of an email communication;
email domains of an email communication; and
extracted named entities from the email text of an email communication.

10. The method of claim 2, wherein scoring the new communication record, comprises:
assigning weights to all the features in the feature vector; and
wherein each weight indicates relative correlation between the feature value for each feature in the feature vector and a likelihood of a match between the new communication record and the candidate CRM record for which the feature value is computed.

11. Non-transitory computer-readable storage media having instructions stored thereon that, when executed by a system having at least a processor and a memory therein, the instructions cause the system to perform the following operations:
storing a plurality of Customer Relationship Management (CRM) within a CRM system, each CRM record including one or more communication records;
retrieving a plurality of record-pairs from the CRM system, each defining a communication-record to CRM-record as the respective record-pair;
wherein each of the plurality of record-pairs defines one of: (i) a false-record-pair having a communication-record incorrectly assigned to a CRM-record and later manually deleted or reassigned within the CRM system or (ii) a true-record-pair having a communication-record correctly assigned to a CRM-record via manual matching to a CRM record within the CRM system;
calculating feature-values for each of a plurality of features identified among the plurality of record-pairs, each feature-value indicating a degree to which an attribute shared by a respective communication record and the associated CRM record within any of the record-pairs match;
calculating via a support vector machine global weights for the feature-values across a plurality of organizations that provide greatest separation between the correct-assignments of the true-record-pairs and the incorrect-assignments of the false-record-pairs;
evaluating the feature-values to serially calculate:
a company-specific weight providing greatest separation between the correct-assignments and the incorrect-assignments for only the record-pairs belonging to each of the plurality of organizations, wherein the company-specific weight is calculated based on a difference value between the global weights and the company-specific weight, and
a user-specific weight providing greatest separation between the correct-assignments and the incorrect-assignments for a plurality of users, wherein the user-specific weight is calculated based on a difference value between the company-specific weight and the user-specific weight;
scoring a new communication record not in the plurality of record-pairs against a plurality of candidate CRM records, each scored as a weighted sum over the feature-values using the global weights, the company-specific weights, the user-specific weights, and the difference values calculated; and
matching and assigning the new communication record to one of the candidate CRM records based on the scoring exceeding a pre-defined threshold, wherein the pre-defined threshold is configurable to maintain a target number of false-record-pairs and true-record-pairs; and
automatically inserting entries into the candidate CRM records corresponding to the assigned communication records.

12. The non-transitory computer-readable storage media of claim 11:
wherein the user-specific weights account for differences in e-mail and business practices among different users within each of the plurality of organizations and are calculated to provide maximal separation among e-mail classifications represented within the feature-values indicating the degree to which each attribute shared by the respective communication record and the associated CRM record within any of the record-pairs match;
wherein the instructions, when executed by the processor of the system, cause the system to perform operations further including:
computing a feature vector of the feature values selected from the plurality of features in the training set for each record pair of the plurality of record-pairs; and
wherein the feature vector defines a vector of binary values indicating a higher degree of correspondence for the features of the record pairs having a binary value of "1" defined by the feature vector and indicating a lower degree of correspondence for the features of the record pairs having a binary value of "0" defined by the feature vector.

13. The non-transitory computer-readable storage media of claim 11, wherein calculating feature-values for each of the plurality of features identified among the plurality of record-pairs, comprises:
calculating the feature values, wherein each feature value indicates a degree of correspondence between a communication datum in a specified field of a given communication record from among the plurality of record pairs and a CRM datum in a specified field of a corresponding CRM record of the respective record pair to which the given communication record was correctly or incorrectly assigned.

14. The non-transitory computer-readable storage media of claim 11, wherein the instructions, when executed by the processor of the system, cause the system to perform operations further including:
computing a feature vector of feature values selected from the plurality of features for each record pair; wherein the feature vector indicates a match is likely for the features of the record pairs having a binary value of "1" defined by the feature vector and further indicates a match is unlikely for the features of the record pairs having a binary value of "0" defined by the feature vector.

15. The non-transitory computer-readable storage media of claim 11, wherein the plurality of features further define:
   first contents derived from a first field of the communication record within one of the plurality of records pairs;
   second contents derived from a second field of the CRM record within the one of the plurality of records pairs; and
   wherein the feature is identified based on the first contents containing the second contents or based on the second contents containing the first contents.

16. The non-transitory computer-readable storage media of claim 11, wherein the instructions, when executed by the processor of the system, cause the system to perform operations further including assembling a machine learning training set by identifying each of:
   (i) manually saved communication records in the CRM database system, each having been manually saved to an associated CRM record by a system user of the CRM database system indicating a correct assignment;
   (ii) manually deleted communication records in the CRM database system, each having been manually deleted from a previously associated CRM record by a system user of the CRM database system indicating an incorrect assignment; and
   (iii) manually reassigned communication records in the CRM database system, each having been manually reassigned from a previously associated CRM record to a different CRM record by a system user of the CRM database system indicating both a previously incorrect assignment prior to reassignment and a correct assignment subsequent to reassignment.

17. The non-transitory computer-readable storage media of claim 12, wherein scoring the new communication record, comprises:
   assigning weights to all the features in the feature vector; and
   wherein each weight indicates relative correlation between the feature value for each feature in the feature vector and a likelihood of a match between the new communication record and the candidate CRM record for which the feature value is computed.

18. A Customer Relationship Management (CRM) database system, comprising:
   a memory to store instructions;
   a processor to execute the instructions stored in the memory;
   wherein the Customer Relationship Management (CRM) database system stores a plurality of Customer Relationship Management (CRM) within a CRM system, each CRM record including one or more communication records; wherein the processor is to execute a CRM match and analyze function to assemble a machine learning training set by retrieving a plurality of record-pairs from the CRM system, each defining a communication-record to CRM-record as the respective record-pair; wherein each of the plurality of record-pairs defines one of: (i) a false-record-pair having a communication-record incorrectly assigned to a CRM-record and later manually deleted or reassigned within the CRM system or (ii) a true-record-pair having a communication-record correctly assigned to a CRM-record via manual matching to a CRM record within the CRM system;
   wherein the processor is to further calculate feature-values for each of a plurality of features identified among the plurality of record-pairs, each feature-value indicating a degree to which an attribute shared by a respective communication record and the associated CRM record within any of the record-pairs match;
   wherein the processor is to further calculate via a support vector machine global weights for the feature-values across a plurality of organizations that provide greatest separation between the correct-assignments of the true-record-pairs and the incorrect-assignments of the false-record-pairs;
   wherein the processor is to further evaluate the feature-values to serially calculate:
      a company-specific weight providing greatest separation between the correct-assignments and the incorrect-assignments for only the record-pairs belonging to each of the plurality of organizations, wherein the company-specific weight is calculated based on a difference value between the global weights and the company-specific weight, and
      a user-specific weight providing greatest separation between the correct-assignments and the incorrect-assignments for a plurality of users, wherein the user-specific weight is calculated based on a difference value between the company-specific weight and the user-specific weight;
   wherein the processor is to further score a new communication record not in the plurality of record-pairs against a plurality of candidate CRM records, each scored as a weighted sum over the feature-values using the global weights, the company-specific weights, the user-specific weights, and the difference values calculated; and
   wherein the processor is to further match and assign the new communication record to one of the candidate CRM records based on the scoring exceeding a pre-defined threshold, wherein the pre-defined threshold is configurable to maintain a target number of false-record-pairs and true-record-pairs; and
   automatically inserting entries into the candidate CRM records corresponding to the assigned communication records.

19. The Customer Relationship Management (CRM) database system of claim 18:
   wherein the user-specific weights account for differences in e-mail and business practices among different users within each of the plurality of organizations and are calculated to provide maximal separation among e-mail classifications represented within the feature-values indicating the degree to which each attribute shared by the respective communication record and the associated CRM record within any of the record-pairs match;
   wherein the processor is to further execute the CRM match and analyze function to compute a feature vector of the feature values selected from the plurality of features in the training set for each record pair of the plurality of record-pairs; and
   wherein the feature vector defines a vector of binary values indicating a higher degree of correspondence for the features of the record pairs having a binary value of "1" defined by the feature vector and indicating a lower degree of correspondence for the features of the record pairs having a binary value of "0" defined by the feature vector.

20. The Customer Relationship Management (CRM) database system of claim 19:

wherein the CRM match and analyze function is to score the new communication record, by:

assigning weights to all the features in the feature vector; and wherein each weight indicates relative correlation between the feature value for each feature in the feature vector and a likelihood of a match between the new communication record and the candidate CRM record for which the feature value is computed.

* * * * *